Aug. 17, 1954   H. S. HOFFMAN   2,686,550
ANTISKID DEVICE
Filed Jan. 16, 1952   3 Sheets-Sheet 1
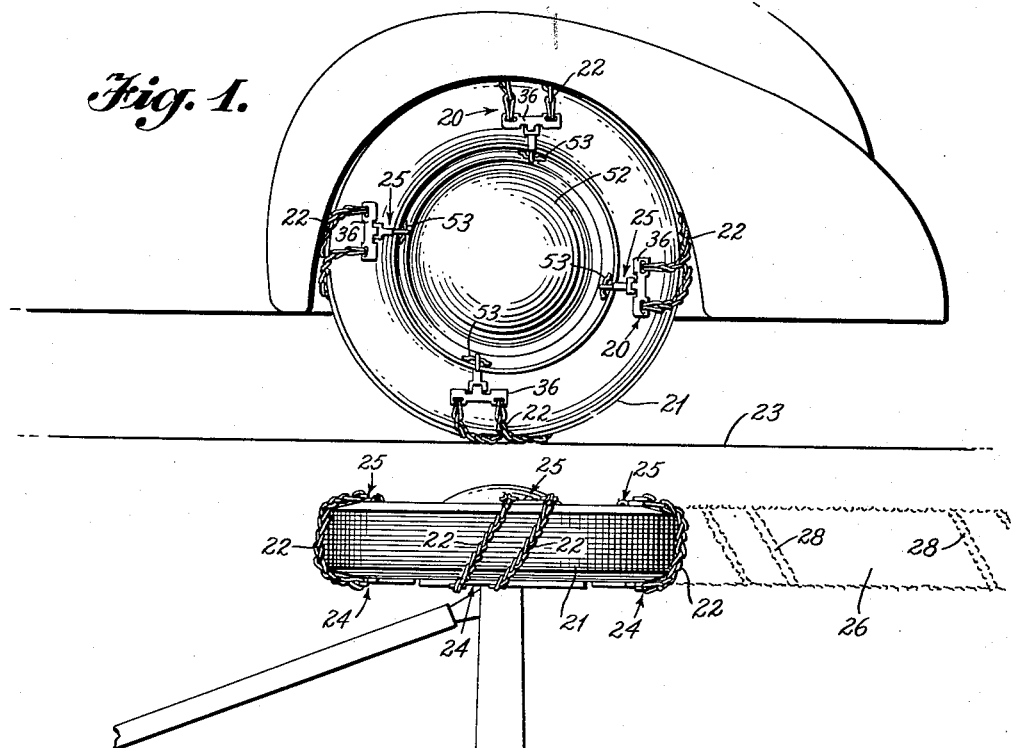
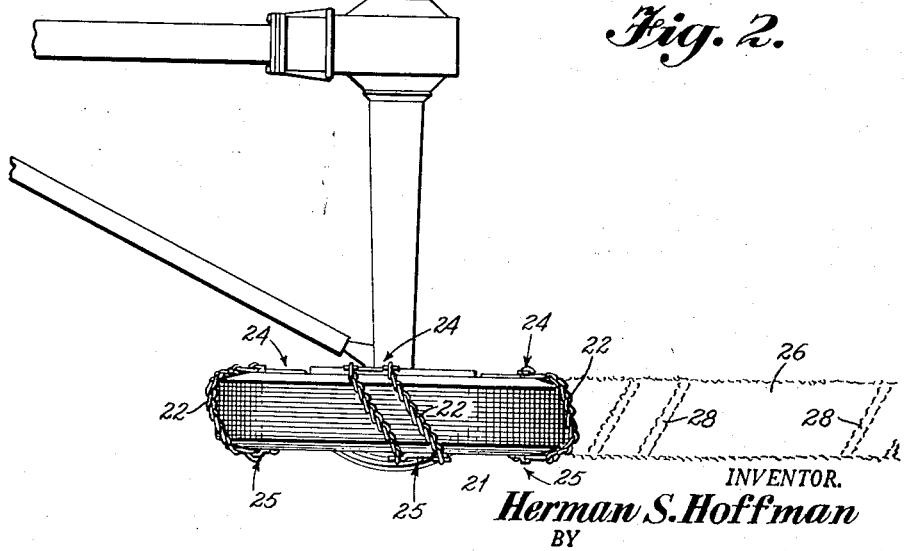
INVENTOR.
*Herman S. Hoffman*
BY
*Stevens, Davis, Miller & Mosher*
ATTORNEYS

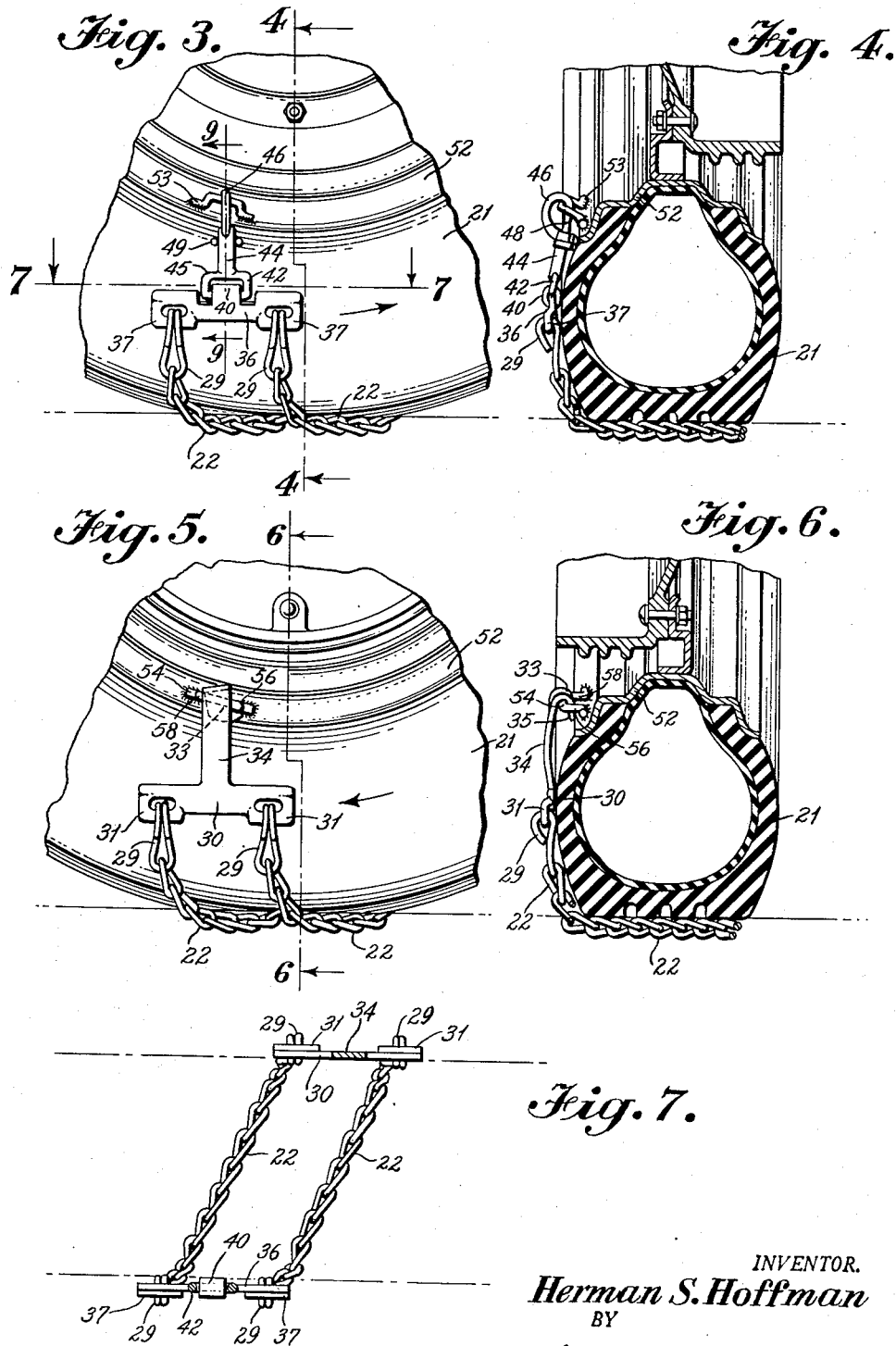

Aug. 17, 1954
H. S. HOFFMAN
2,686,550
ANTISKID DEVICE
Filed Jan. 16, 1952
3 Sheets-Sheet 3
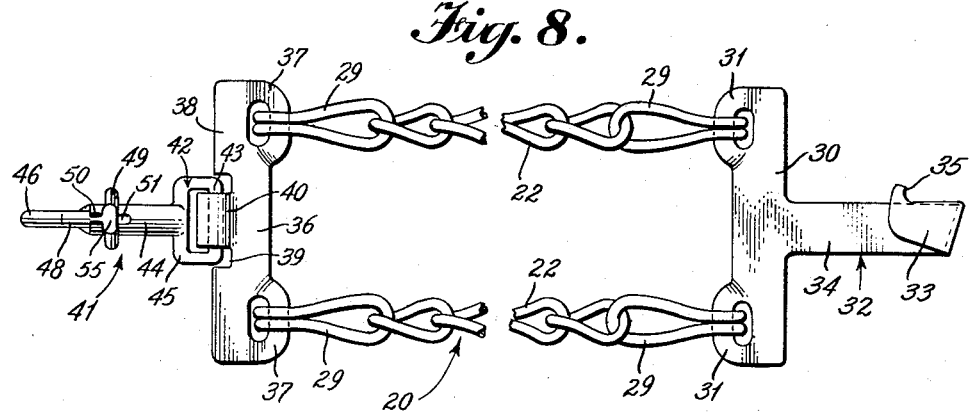
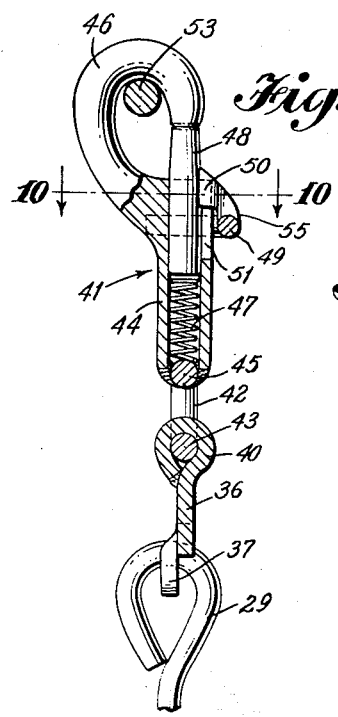
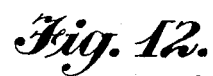
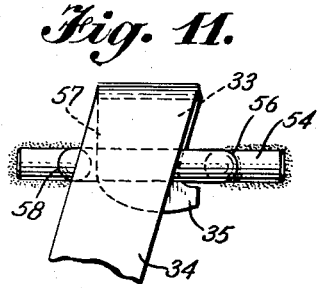
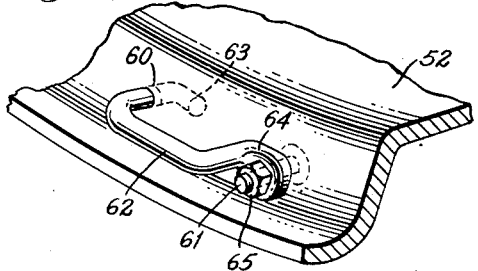
INVENTOR.
*Herman S. Hoffman*
BY
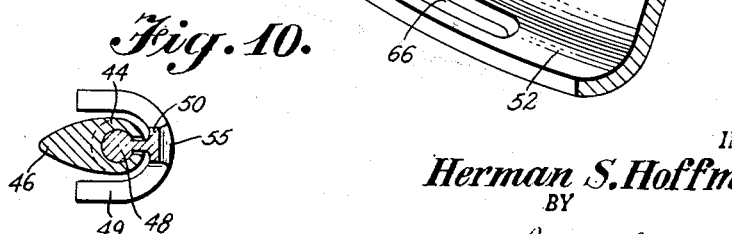
ATTORNEYS Patented Aug. 17, 1954

2,686,550

UNITED STATES PATENT OFFICE 2,686,550

ANTISKID DEVICE

Herman Solomon Hoffman, Washington, D. C.

Application January 16, 1952, Serial No. 266,665

6 Claims. (Cl. 152—233)

1

This invention relates to anti-skid devices for use with automobiles.

Sliding and slipping of automobile wheels is a well recognized hazard in the operation of the automobile in slippery weather particularly under snowy or icy conditions and to a lesser extent rainy conditions. The desirability of using chains to stop skidding and sliding of the wheels has been firmly established and as a result chain devices of one sort or another have been widely used by automobile operators.

The inconvenience of applying full chains to the wheels has caused many persons to forego safety rather than perform the arduous task of application. This task has become increasingly difficult recently due to modern changes in designs of automobiles in and around the wheels. Streamlined fenders and wheel skirts have attempted to hide the wheels as much as possible. In so doing they made the application of chains to the wheels so inconvenient that many do not even attempt it. This is particularly true as regards women. In order to circumvent this difficulty and to satisfy the public desire for chains, many chains have been devised. However, all attempts to accomplish this purpose have resulted in chain devices which are readily attachable but their constructions are such that they only serve to do a good temporary job. They do not measure up to the performance standards of full chains in service conditions. In short, they cannot stand the test of time.

It is a well recognized desire of every automobile owner or user to have in his possession a durable chain device to prevent skidding which can be easily and quickly put on within a matter of seconds when the circumstances of driving warrant it. This desire has not been satisfied by chain devices previously available.

It is the purpose of the present invention to satisfy this need by providing an anti-skid device which can be applied to the wheels of an automobile by anyone physically able to drive an automobile regardless of age, sex, physical disability, or health impairment. Such anti-skid device is so simple to use that it will not only prove itself more economical by eliminating service charges for application and removal, but will permit the application of chains when service men are unavailable and the automobile wheels are stuck in snow or mud. The device will last longer than present-day chain devices due to its ease of removal by enabling the user to totally eliminate unnecessary use without great effort on his part.

In addition, the device of the present invention for the first time, successfully presents a chain device with substantially increased tractional properties. This anti-skid device gives approximately four times more traction than any chain device heretofore in use by the diagonal or oblique positioning of the anti-skid device across the tread of the tire with respect to the axis of the tire. By means of this arrangement not only are the tractional properties increased, but the danger of side slippage of the rear wheels normally present with former chain devices when starting or stopping the automobile is largely avoided.

It is therefore an object of this invention to provide a long life, durable, and efficient anti-skid chain device for an automobile which can be readily applied or removed from a wheel by anyone physically capable of using the automobile.

It is a further object to provide an anti-skid device having substantially increased tractional properties over those which are available in chain devices of the old type and to minimize the danger of side slippage present with prior chain devices.

It is a still further object of this invention to provide an anti-skid device which will be more economical and efficient than such other chain devices as have heretofore been available.

Other and further objects of the present invention will become apparent from the following detailed description when taken in conjunction with the appended drawings in which:

Figure 1 is a view in side elevation showing the left rear wheel assembly of an automobile with anti-skid devices of the present invention mounted thereon;

Figure 2 is a view in top plan showing the rear wheels of an automobile arranged with anti-skid devices of the present invention illustrating the movement of the automobile over a snow-covered surface.

Figure 3 is an enlarged view in elevation of the bottom portion of the rear wheel assembly as shown in Figure 1;

Figure 4 is a view in vertical section taken along line 4—4 of Figure 3.

Figure 5 is an enlarged view in elevation of the back or reverse side of the bottom portion of the rear wheel assembly as shown in Figure 1;

Figure 6 is a view in vertical section taken along line 6—6 of Figure 5;

Figure 7 is a view in horizontal section taken along line 7—7 of Figure 3;

Figure 8 is a view in top plan showing the anti-skid device of the present invention;

Figure 9 is a view in vertical section taken along line 9—9 of Figure 3;

Figure 10 is a view in horizontal section taken along line 10—10 of Figure 9;

Figure 11 is a view in elevation illustrating the manner of hooking the back connection;

Figure 12 is a fragmentary view in side elevation of the rim of an automobile wheel showing a modified stirrup arrangement, and;

Figure 13 is a fragmentary view in side elevation of the rim of an automobile wheel showing a further modified stirrup arrangement.

Referring now to the drawings, Figure 1 shows anti-skid devices 20 of the present invention as applied to the rear wheel assembly of an automobile. Although four such devices are shown it is to be understood that any number can be used depending entirely upon the conditions of use. Each device 20 is disposed on the surface and tread of tire 21 of the assembly obliquely with respect to the axis of the tire. By means of this particular arrangement a greater length of the cross chains 22 of each device will come in contact with the surface 23 over which the tire 21 is to ride and consequently the tractional effect will be substantially increased over what would be the case if the cross chains 22 were to extend transversely over the tire. The oblique positioning of the device on the wheel is achieved by having the back connection 24 of the device with the wheel leading the front connection 25 with respect to the direction of rotation of the wheel when the automobile is moving forward. This same procedure is applied to the mounting of the device to the other or right rear wheel and the result is as shown in Figure 2. The oblique positions of corresponding cross chains 22 on the rear wheels are diametrically opposed, and hence, produce a stabilizing influence when starting or stopping the automobile which keeps it on a true course. As shown, the tires mounted with devices 20 will produce the tracks 26 in a snow-covered surface. The diagonal marks 28 in the tracks 26 are formed by the devices 20 and as can be seen any tendency to slip sideways due to the devices on one wheel is directly compensated by an equal and opposite tendency due to the devices on the other wheel. The resultant tendency is in line with the forward movement of the automobile.

The device 20 as shown in Figures 8, 9, 10 and 11 consists of a pair of cross chains 22, the terminal links 29 of which are connected at one end to a supporting bracket 30 by means of eyes 31 laterally offset from the body of the bracket. An open hook 32 projects from approximately the center of the body of the bracket and normal thereto. The hooked portion 33 of hook 32 is angularly offset from the shank 34 of the hook and is provided with a detent 35 at its end. Terminal links 29 arranged at the other end of the cross links 22 are connected to a supporting bracket 36 by means of eyes 37 laterally offset from the body of the bracket. The center of the bracket 36 along its outer edge 38 is cut out as indicated at 39. A cylindrical strap 40 is fixed to the bracket 36 in this cut out 39 by suitable means. Pivotally supported by bracket 36 by means of strap 40 is a snap hook 41. This pivotal connection is accomplished by means of a rectangular eye 42 at one end of snap hook 41 and by having a bar 43 of eye 42 housed in cylindrical strap 40. The snap hook 41 consists of a cylindrical shank 44 closed at one end by a bar 45 of eye 42 fixed thereto, a hook portion 46 extending from the shank 44, a spring 47 housed in shank 44 and resiliently urging plunger 48 into contact with hook portion 46, and a U-shaped operating bar 49 fixed to plunger 48 for manipulating the plunger 48 into and out of engagement with the hook portion 46. Bar 49 is fixed to plunger 48 by means of an intermediate stud 50 and the shank 44 is slotted as at 51 to permit the requisite sliding movement of plunger 48.

To connect the device to an automobile wheel, sets of U-shaped stirrups or bars are employed. To the front of the wheel on rim 52, a set of stirrups 53 is fixed at spaced points depending upon the number of devices 20 that are desired. It has been found in practice that four such devices 20 mounted on a wheel suitably serve the purposes of the present invention. However, it is to be understood that more or less than four can be successfully employed. Considering, by way of example, the use of four devices, a set of four stirrups 53 is fixed to the outside or front face of rim 52 of the wheel. Each stirrup 53 is mounted on rim 52 to project outwardly from rim 52 and inwardly toward the center of the wheel. To the back of the wheel on the inside face of rim 52 is fixed a set of four stirrups 54. Each back stirrup 54 projects substantially coaxially with the wheel and is arranged on the rim to lead the corresponding front stirrup 53 in the direction of rotation of the wheel when the automobile is moving forward. This results in cross chains 22 being disposed obliquely across the tire when the device is attached to the wheel as hereinbefore described.

It can thus be seen that corresponding stirrups 53 and 54 are peripherally spaced apart. As the rear or back connection is most difficult to make, the position of stirrup 54 is selected to provide the greatest opening for the insertion of open hook 32. As aforesaid this is by having stirrup 54 project coaxially away from rim 52. The front connection is rather easily attained and therefore the back connection is made first. Thereafter the cross chains 22 can be tightly pulled across tire 21 and snap hook 41 can be engaged with stirrup 53. This eliminates any undue slack in cross chains 22.

The details of connecting the device to a wheel are shown in Figures 3-7 inclusive. For illustration, the device 20 is shown connected to the left rear wheel of an automobile. As stated before, the front and back connections are made to rim 52 of the wheel. The front connection, shown in Figures 3 and 4, is made between snap hook 41 and stirrup 53 fixed to rim 52. It is to be noted that U-shaped bar 49 keeps snap hook 41 out of contact with tire 21 except for the small surface in the middle of bar 49. This is shown in Figure 4. The function of this particular arrangement is to facilitate the removal of snap hook 41. By virtue of the fact that U-shaped bar 49 curls around the shank 44 of hook 41 the manipulation of plunger 48 is effected from the rear of hook 41 which faces away from the tire 21. Thus this construction eliminates the necessity of getting in between the tire 21 and hook 41 in order to operate plunger 48.

The rear connection 24 is shown in Figures 5 and 6. Open hook 32 is seated in stirrup 54 so that the angularly offset hooked portion 33 and detent 35 are directed toward the front of the automobile. It is therefore desirable to have two sets of devices, one set being for the left wheels and a second set for the right wheels. The hooked portions 33 and detents 35 for the former set will be angularly offset from shank 34 oppositely to the hooked portion and detents for the later set. This is desirable for the reason that in placing the open hook in its stirrup the hooked portion 33 and detent 35 should be angularly offset in the direction of forward movement of the automobile.

When it is desired to mount the device to a wheel, considering by way of example the left rear wheel, the open hook 32 is first placed in stirrup 54 as shown in Figure 11, the cross chains 22 are then brought obliquely across the surface of tire 21 and snap hook 41 is connected to stirrup 53. This manner of hooking prevents undue slack in cross chains 22. After the device is hooked to the automobile as above defined, it is ready for use. As the automobile is started and begins its forward movement, and the tires rotate the following action takes place to positively lock the device to the wheel. Again considering the left rear wheel, as tire 21 rotates and cross chains 22 strike the ground, their movement will temporarily stop due to the friction between the ground and cross chains 22. The wheel and tire 21 will slide over the cross chains 22 extending them to their full length across the tire 21. This will cause both snap hook 41 and open hook 32 to move to the legs of their respective stirrups nearest the front of the automobile. As open hook 32 assumes this position, it tends to cant. However, the forward motion of hook 32 causes detent 35 to be placed beneath the leg 56 of its stirrup 54 to positively lock it in the stirrup. Thus open hook 32 is prevented from further canting or rotating in stirrup 54 by virtue of the drag on the cross chains 22. The hook 32 is shown in Figure 5 in this position.

It will be noted in this regard that the hook portion 33 extends far enough into stirrup 54 so that it will not become unhooked while the automobile is being operated under normal conditions. Further it will contact leg 56 with or without detent 35 as a result of the previous action. This applies whether the automobile is moving forward or backward. However, in the operation of an automobile, bumps and holes are often encountered in normal forward travel and oftentimes at moderate or high speeds. When the wheels of the automobile strike a bump or run into a hole, the shock causes a compression of the tire at the point of contact. If the device on the wheel and the point of contact are coincident as will sometimes be the case, the compression of the tire will tend to cause open hook 32 to jump out of stirrup 54. By arranging the hooked portion 33 with an angular offset and providing detent 35 at the end thereof, the normal forward movement of the automobile will force detent 35 into contact with leg 56 to lock hook 32 in stirrup 54 and prevent its displacement as above described. The normal backward motion of an automobile being relatively slow and infrequent, this extra precaution is unnecessary. Hook 32 will retain its seated position by virtue of hooked portion 33 being of a sufficient length that it will not jump out of stirrup 54 when the automobile is driven in reverse. Since the speed will normally be slow and the duration short, the contact between edge 57 and leg 58 will securely hold hook 32 in stirrup 54.

An additional feature of this invention resides in the fact that it affords greater driving comfort. Chain devices which extend laterally across the wheel produce a pumping and jouncing when the automobile is driven due to the abrupt contact between the chain and the ground. By having the chain device obliquely across the tire, the cross chains strike the ground one link at a time. This enables the tire to ride up on the cross chains gradually. There is also an overlapping of the cross chains laterally of the tire. Therefore the tire will gradually ride up on the front cross chain and gradually ride down the rear cross chain as the links leave the ground one link at a time. By virtue of this arrangement, the bumping and jouncing is reduced to an absolute minimum and smooth riding is insured.

In lieu of the stirrups 53 and 54, the device be connected to rim 52 by simply providing rim 52 with a hole 60 and a bolt 61 suitably spaced apart as shown in Figure 12. A generally U-shaped bar 62 provided with a slight hook 63 on one end for fitting in the hole 60 and an eye 64 on the other end for fitting over bolt 61 can be employed. A nut 65 can be utilized to retain eye 64 on bolt 61. By this arrangement the removal or replacement of bar 62 is greatly facilitated. Also the rim 52 can be slotted as shown in Figure 13. The rim 52 can be provided with an elongated slot 66 extending substantially peripherally of rim 52.

While this invention has been described with reference to a single embodiment it is to be understood that various changes and modifications obvious to one skilled in the art are within the spirit, scope, and contemplation of the present invention.

What is claimed is:

1. An anti-skid assembly for an automobile having a wheel mounted thereon for rotation, said wheel having on each side thereof means defining a circumferentially elongated aperture, said aperture means on opposite sides of the wheel being circumferentially offset; said anti-skid assembly comprising an open hook for engagement in said aperture means at one side of the wheel, said hook and said aperture means defining coacting means to lock said hook against disengagement in one position of engagement, said hook being unlocked for disengagement from said aperture means in all other positions of engagement, an anti-skid chain connected at one end to said hook, and lock means connected to the other end of said chain adapted to cooperate with the aperture means at the other side of said wheel to hold said chain diagonally across the wheel tread whereby to urge said hook and said aperture means into said position of engagement.

2. An anti-skid assembly as defined in claim 1 wherein said open hook is characterized by an elongated shank portion and a hooked portion that is bent back to overlie said shank portion with the line of bend being at an acute angle to the long axis of said shank portion.

3. An anti-skid assembly as defined in claim 1 wherein said open hook defines a detent to cooperate with said aperture means.

4. An anti-skid assembly as defined in claim 1 wherein said lock means includes a snap hook.

5. An anti-skid assembly as defined in claim 1 wherein said lock means includes a snap hook and an operating bar therefor, said operating bar curving around said snap hook whereby said snap hook is operable from the rear.

6. An anti-skid assembly as defined in claim 1 wherein a bracket is integral with said open hook and a pair of anti-skid chains connect said bracket with said lock means.

References Cited in the file of this patent

UNITED STATES PATENTS

| Number | Name | Date |
| --- | --- | --- |
| 987,806 | Kibby | Mar. 28, 1911 |
| 1,093,630 | Kelly | Apr. 21, 1914 |
| 1,279,837 | Burlingame | Sept. 24, 1918 |
| 1,285,033 | Carlton | Nov. 19, 1918 |
| 1,542,686 | Fath | June 16, 1925 |
| 1,577,454 | Drescher et al. | Mar. 23, 1926 |
| 2,539,517 | Locke | Jan. 30, 1951 |
| 2,631,636 | Chancellor | Mar. 17, 1953 |
| 2,631,637 | Purdy | Mar. 17, 1953 |